United States Patent [19]
Chu et al.

[11] Patent Number: 5,916,684
[45] Date of Patent: Jun. 29, 1999

[54] SIMPLE PROCESS FOR ANTI-REFLECTION COATING WITH MULTIPLE METAL FILMS

[75] Inventors: Jau-Jier Chu; I-Wen Lee, both of Hsin-chu, Taiwan

[73] Assignee: Applied Vacuum Technologies Co., Ltd., Hsin-chu, Taiwan

[21] Appl. No.: 08/995,914

[22] Filed: Dec. 22, 1997

[51] Int. Cl.$^6$ ....................................................... B32B 17/00
[52] U.S. Cl. .......................... 428/426; 428/428; 428/433; 428/434; 428/457; 428/461; 428/469; 428/472; 359/359; 359/586; 359/588
[58] Field of Search .................................. 428/457, 469, 428/472, 461, 428, 426, 433, 434; 359/359, 360, 585, 586, 588

[56] References Cited

U.S. PATENT DOCUMENTS 4,282,290  8/1981  Pellicori ................................. 428/472
4,996,105  2/1991  Oyama .................................... 428/336

*Primary Examiner*—Timothy M. Speer
*Attorney, Agent, or Firm*—Rosenberg, Klein & Bilker

[57] ABSTRACT

An anti-reflection screen filter is provided that includes four consecutively applied layers to a substrate. A first layer, furthest from the substrate, is arranged on an underlying second layer and comprises an oxide material having a refractive index within the approximating range of 1.46 to 1.50 at a wavelength of 520 nm. The second layer is arranged on an underlying third layer and is formed by a metal having a refractive index within the approximating range of 1.5 to 4.0 at a wavelength of 520 nm. The third layer is arranged on an underlying fourth layer and is formed by a metal having a refractive index within the approximating range of 0.2 to 1.4 at a wavelength of 520 nm. The fourth layer is disposed on the front surface of a substrate and is formed by a metal having a refractive index within the approximating range of 1.5 to 4.0 at a wavelength of 520 nm.

9 Claims, 2 Drawing Sheets

SIMPLE PROCESS FOR ANTI-REFLECTION COATING WITH MULTIPLE METAL FILMS

BACKGROUND

The present invention is related to a coating composed of an optically effective layer system, for glass and/or plastic substrate, whereby the layer system has a high anti-reflection effect. More specifically the invention related to multi-layer of metal films which has high scratch resistance.

U.S. Pat. No. 4,921,760, whose disclosure is an multi-layer anti-reflection coating (3–5 layer) with excellent adhesion between $CeO_2$ layer and synthetic resin. The layer system including $CeO_2$, $Al_2O_3$, $ZrO_2$, $SiO_2$, $TiO_2$ and $Ta_2O_5$. All the thin films of the layer system are oxide materials.

U.S. Pat. No. 5,105,310, whose disclosure is an multi-layer anti-reflection coating designed for deposition in in-line coating matching by reactive sputtering. The layer system including $TiO_2$, $SiO_2$, ZnO, $ZrO_2$ and $Ta_2O_5$. All the thin films of the layer system are oxide material.

U.S. Pat. No. 5,091,244 and 5,407,733, disclosed a new type electric conductive light-attenuating anti-reflection coating. The major claim is an article comprising of nitrides of certain transition metal to provided an electrically-conductive, light-attenuating, anti-refection surfaces. The layer systems including TiN, NbN, $SnO_2$, $SiO_2$, $Al_2O_3$ and $Nb_2O_5$. The thin films of the layer system are nitride and oxide materials.

U.S. Pat. No. 4,196,246, 5,170,291 and 5,147,125 whose disclosures are a serious anti-reflection coating on different substrate by using different process. The layer systems including $TiO_2$, $SiO_2$, ZnO, $Al_2O_3$, $Bi_2O_3$, ZnS and $MgF_2$. All the thin films of those layer systems are compose materials of oxide, sulfide and fluoride.

U.S. Pat. No. 5,216,542 whose disclosure is a five layer coating with high anti-reflection effect. The process use an adhesive layer of Ni, Cr or NiCr metal with a thickness about 1 nm (nanometer). Other four layers are compose of $SnO_2$, $ZrO_2$, ZnO, $Ta_2O_5$, NiO, $CrO_2$, $TiO_2$, $Sb_2O_3$, $In_2O_3$, $Al_2O_3$ $SiO_2$, TiN and ZrN.

U.S. Pat. No. 5,541,770 whose disclosure is a light attenuating anti-reflection coating including electrically conductive layers. It is a four or five layer system. A light absorption high refractive index metal such as Cr, Mo and W was used as a optically effective thin film in the layer system. The other three or four layers are $TiO_2$, ITO, $Al_2O_3$, $SiO_2$ and TiN. The patent shows that the majority materials of the layer system are oxide and nitride, only one metal film was used as an optical effective thin film in the anti-reflection coating.

The above description shows clearly that oxide and nitride are the dominate materials of the layer system for a typical and traditional anti-reflection coating.

SUMMARY OF THE INVENTION

An object of the present invention is to provided an anti-reflection coating layer system composed of three metal layer and one oxide layer.

The process of manufacturing metal thin film in volume production was high reliable and was routinely used in the industries such as semiconductor, hard disc, optical disc, display, architecture glass, and plastic web coating for a several tens years. Because of the metal thin films is easy to deposit with high deposition rate (either in process of evaporation or sputtering) the present invention provided an anti-reflection coating for simple, economical, high volume production in a batch or in-line PVD (physical vapor deposition) system.

It is well known that the sputtering rate of oxide material such as $TiO_2$, $Al_2O_3$, $Ta_2O_5$, $Nb_2O_5$, and $ZrO_2$ etc. is quite low either from metal target for a typical reactive DC, AC and RF sputtering process or from oxide target for a typical RF sputtering process. A roughly estimate show that for a conventional layer system composing of oxide materials a total thickness of about 200 nm was required to form a optically effective wide band anti-reflection coating. Experimentally shows that reactive sputtering of oxide materials such as $TiO_2$, $Al_2O_3$, $Ta_2O_5$, $Nb_2O_5$, and $ZrO_2$ with a thickness above 100 nm impart much of heat to the substrate due to the low sputtering rate of those materials. In the oxide sputtering process, the energetic atom, the high energy secondary electron and the thermal radiation which were ejected from the target surface transfer a large amount of heat to the substrate when the thickness of the oxide layer was gradually accumulated to a certain value which is optically effective. The substrate temperature will be high above 100 degree for a totally oxide layer system mass producing in a in-line sputtering system with short cycle time below 90 seconds. On the other hand for a oxide layer system the temperature sensitive substrate for example plastic is difficult to manufacture in a short cycle high volume production process because of the plastic is easy to deformation during high process temperature. The present invention is to provide a anti-reflection layer system compose of basically three layers of metal materials and only one layer of oxide materials. Because of the high sputtering rate of metal and only one oxide layer was included, the layer system reduce much of heat during sputtering. The present invention provided a low temperature process of anti-reflection coating which can be applied on the glass and plastic substrate.

There are four layers, namely, the first, second, third and fourth layers in consecutive numerical order beginning with the layer furthest from the substrate for the present invention of anti-reflection coating. The each layer was describe in terms of physical thickness or optical thickness. The optical thickness is a mathematical product of a layers thickness and its refractive index. It is described as a fraction of a designed wavelength. In the present invention the designed wavelength is about 520 nm.

The first or the outmost layer 1 is a oxide materials. The oxide layer, preferably $SiO_2$, substantially non-absorbing for visible light, has a refractive index between 1.45 to 1.50, at a wavelength of about 520 nanometer (nm) and an optical thickness of about one fifth wave length at the design wavelength.

The second layer comprises metals selected from a group consisting of Ni, Cr, Ti, V, Co and ss (stainless steel) and a mixtures of these metals. The second layer h as a refractive index between 1.5 and 4.0.

The third layer comprises a mixture of metals selected from a group consisting of majority metals of gold, silver and copper and minority metals of Ni, Cr, Ti, V, Co, Nb and Ta. The weight fraction of minority materials is between 2% to 15%. The third layer has a refractive index between 0.2 and 1.4.

The fourth layer is the same as the second layer which comprises metals selected from a group consisting of Ni, Cr, Ti, V, Co and SS (stainless steel) and a mixtures of these metals. The fourth layer has a refractive index between 1.5 and 4.0.

In the preferred embodiment, the four layer coating includes a first layer of silicon dioxide having a thickness of 70 nm, a se cond layer of NiCr (Cr 30%) having a thickness of about 1 nm, a third layer of AuNi(Ni8%) having a thickness of about 5 nm and a fourth layer is a layer of NiCr (Cr30%) having a thickness about 1 nm.

The stated objects are achieved by the invention, a smooth wide band reflection spectrum can be obtain on the glass or plastic substrate in the visible range from 400 nm to 700 nm. It is easy demonstrated that the process is simple, easy control, low temperature and economically. It has become possible in this way to produce an extremely neutral anti-reflection coating. Of particulate advantage, a in-line sputtering system was suggest to deposit the layer system of the present invention for low cost manufacturing. On the other hand, the layer system of this invention is of high scratch resistance. For instance, a four layer anti-reflection coating on glass substrate according to the typical process of this embodiment, the layer system is hard enough to pass the scratch test of military standard MIL-C-48497 by a given eraser. It is because of the hardness of soft metal such as gold, silver and copper was increasing by mix a certain amount of hard metal with it.

Thereby, a simple DC magnetron sputtering can be provided to deposit the second and forth layer from a NiCr target in the presence of a sputter gas of Ar, under a given pressure of approximately 3 m Torr ( m=mili=0.001).

For the third layer, it is proposed that by using DC. magnetron sputtering from the AuNi target a layer composed of AuNi is generated in the presence of a sputter gas of Ar under a given pressure of approximately 3 m Torr. For the first layer it is proposed that via DC, AC or RF magnetron sputtering from the Si target a layer composed of $SiO_2$ is generated in the presence of a sputter gas mixture comprising Ar and $O_2$, under a given pressure of approximately 2.0 m Torr.

The following advantages are achieved with the invention:

The substrate temperature rising problem due to the energetic sputtering particle bombarding the substrate so as to form a thicker oxide layer system are solved. The present invention provided a four layer system which included three metal layer and one oxide layer. The thickness of second, third and fourth metal layer are 1, 5 and 1 nm, respectively. The thickness of first layer of $SiO_2$ is 70 nm. Because of the high sputtering rate of metal layers the substrate temperature rising in the present invention is nearly equote to the temperature rising in the produce of layer 1, namely $SiO_2$, which is below 50 degree in a in-line sputtering system with a cycle time 60 seconds. A roughly estimate show that for a conventional layer system composing of oxide materials a total thickness of about 200 nm was required to form a optically effective wide band anti-reflection coating. Of particular interest, the total thickness of the layer system of the present infection is about 77 nm, which is about 50% below comparable systems of the prior art. It is obvious shown that the present invention dramatically reduce not only the process temperature but also the materials cost for the mass production of the anti-reflection coating. Accordingly, the present invention having a layer system composed of three metal layers and one oxide layer which is a simple, easy, low temperature and economic process for the anti-reflection coating on glass and particular on plastic substrate.

DESCRIPTION OF THE PREFERRED EMBODIMENTS

The present invention related to an metal based light-attenuation coating with 4 layers. The multilayer structure are numbered in sequence beginning from the outermost layer i.e. the layer furthest from a substrate surface on which the thin films is deposited. Layers thickness values are specified as either a physical thickness in nm or as an optical thickness as some fraction or multiple of a wavelength of visible light. The typical value is 520 nm.

Figure 1:
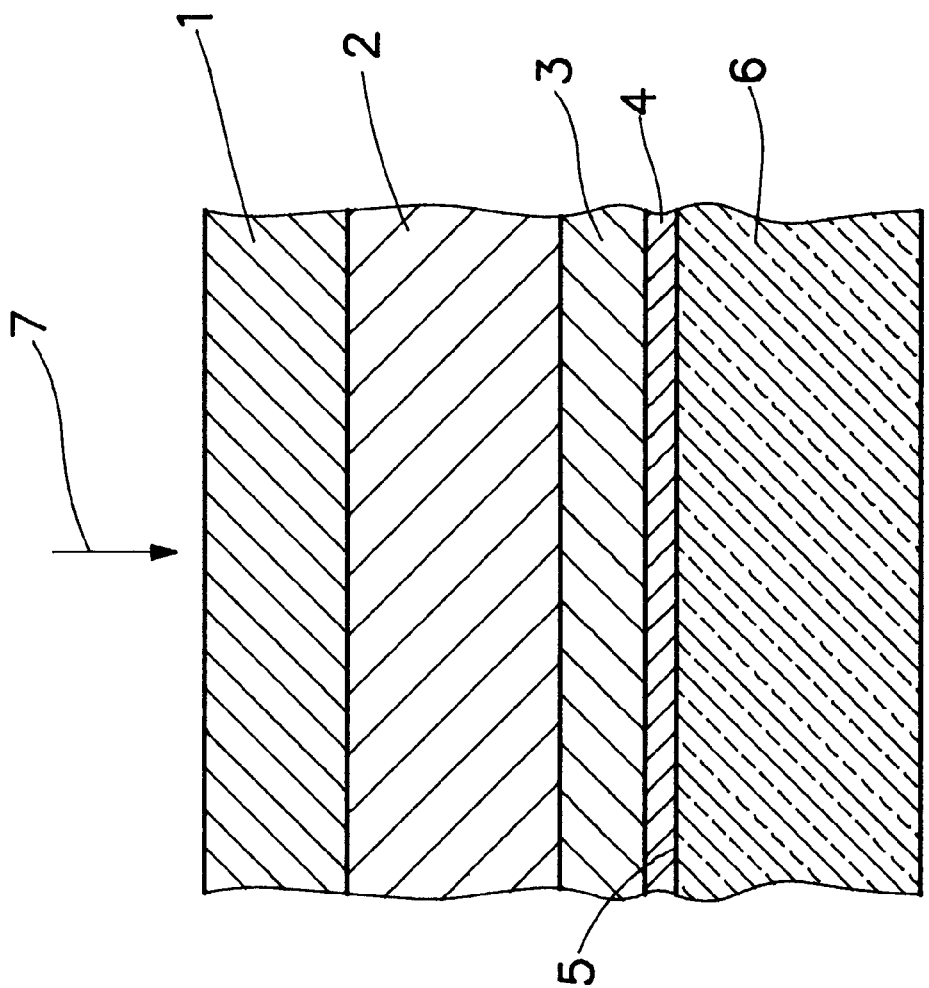
FIG. 1 Schematically shows a cross sectional view of a layer system according to the present invention.

The layer structure of a preferred embodiment of the present invention is shown in FIG. 1. A substrate 6 can be composed of glass, a plastic foil or another see-through materials. A front surface of substrate 6, namely side 5, is that side of substrate facing the observer. The direction of viewing is indicated by arrow 7. A layer 4, which is contacting the front side 5 of the substrate 6, is called a fourth layer 4. In the direction to the observer follows the third layer 3 being arranged on the fourth layer 4 which is next to the front surface of the substrate. The second layer 2 of the four layers being arranged on third layer 3. The first layer, or the outermost layer 1 being arrange on the second layer 2. The layers 1, 2, 3 and 4 form a layer system of the present invention.

The first layer, or the outermost layer 1 is a $SiO_2$ layer with a thickness of 70 nm. The silicon dioxide has a refraction index of about 1.46 at a wavelength of about 520 nm. The second layer 2 of the layer system is a NiCr layer (70 weight percent Ni, 30 weight percent Cr) of a thickness about 1 nm. The Second layer has a refractive index of about 2.0 at a wavelength of about 520 nm. The third layer is a Au-Ni mixture layer of a thickness of 5 nm. The gold-Nickel layer (8 percent Nickel) has a refractive index of about 1.0 at a wavelength of about 520 nm. The forth layer, or innermost layer 4 of the layer system is a NiCr layer (70 weight percent Ni, 30 weight percent Cr) of a thickness about 1 nm. The forth layer has a refractive index of about 2.0 at a wavelength of about 520 nm.

Figure 2:
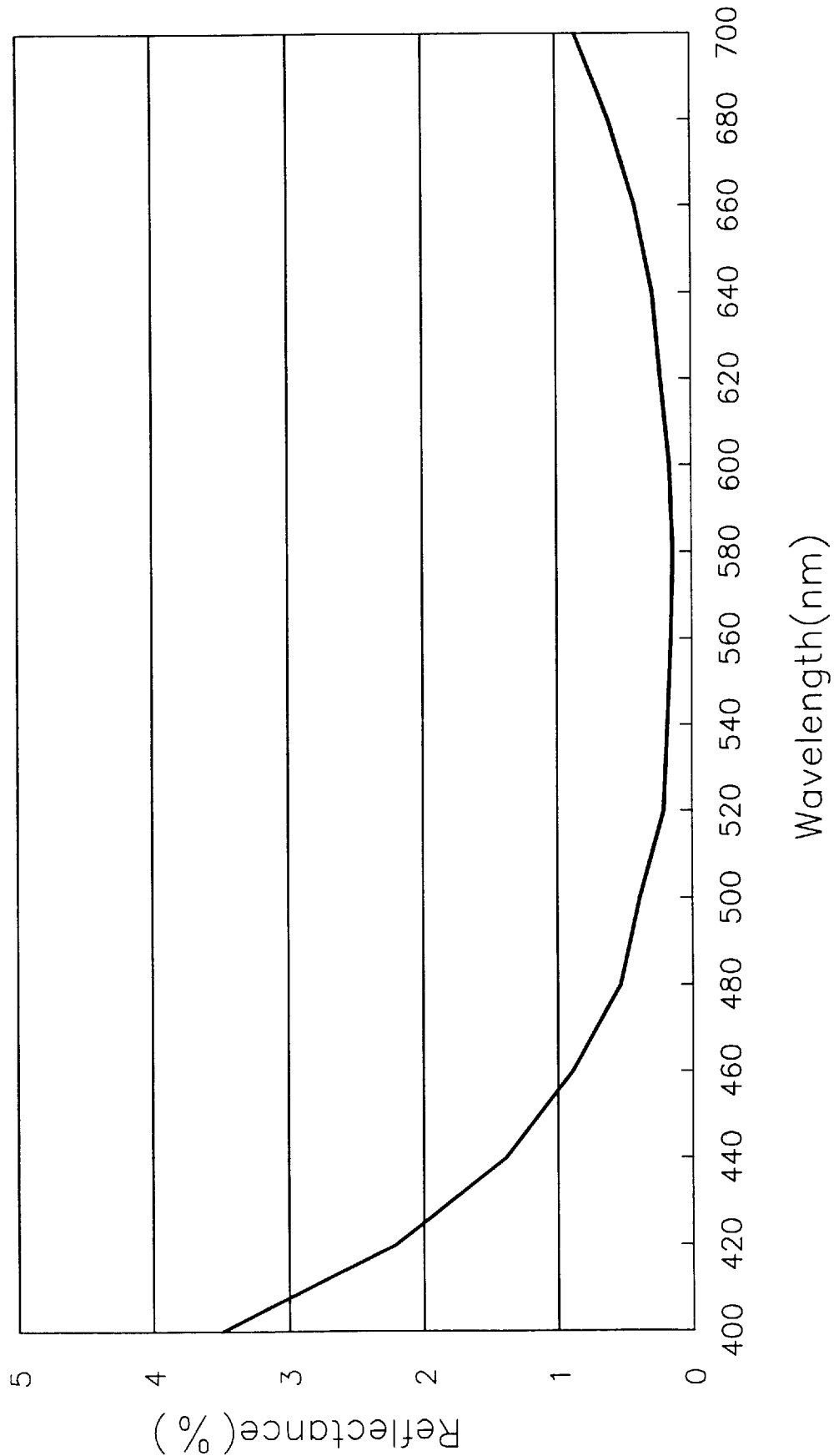
FIG. 2 shows the measured reflection curve in percent versus wavelength in nm of a layer system according to the present invention.

FIG. 2. shows the real reflection spectrum for the layer system. The reflection Was measured in percent at the front surface of the glass. The visible spectrum from a wavelength of 400 nm to a wavelength of 700 nm. The curve reveals clearly that the reflection in the core wavelength region of the light particularly between 520 and 540 nm is extra ordinarily low 0.2%. This result was as good as the reflection spectrum measured from the layer system composed all of oxide materials. Table 1 shows data of reflection and transmission ranging from 400 nm to 700 nm. The sputtering of metal layer 2, 3 and 4 were performed with a magnetron cathode in a inert gas atmosphere of Ar. On the other hand, for first layer, $SiO_2$, the sputtering was performed with a magnetron cathode in a reactive gas atmosphere composed of a gas mixture of Ar and $O_2$. The target materials for layer 4, 3, 2 and 1 were NiCr, AuNI, NiCr and Si, respectively. The target to substrate distance was about 15 cm. No heating device as applied during sputtering process.

TABLE 1

| Wavelength (nm) | Reflection (percent) |
|---|---|
| 400 | 3.48 |
| 420 | 2.21 |
| 440 | 1.40 |
| 460 | 0.87 |
| 480 | 0.52 |
| 500 | 0.38 |
| 520 | 0.23 |
| 540 | 0.17 |
| 560 | 0.14 |
| 580 | 0.13 |
| 600 | 0.15 |
| 620 | 0.21 |
| 640 | 0.29 |
| 660 | 0.40 |
| 680 | 0.58 |
| 700 | 0.84 |

The working pressure during sputtering was described as following:

Sputtering for the layer 4: 2 m Torr.

Sputtering for the layer 3: 3 m Torr.

Sputtering for the layer 2: 3 m Torr.

Sputtering for the layer 1: 3 m Torr.

Although various minor modification may be suggested by those versed in the art, it should be understood that we wish to embody within the scope of the patent granted hereon all such modifications as reasonably and properly come within the scope of our contribution to the art.

We claim:

1. An anti-reflection screen filter, comprising four layers designated the first, second, third and fourth layers in consecutive numerical order beginning with the layer farthest from a substrate;

said first layer being arranged on the second layer and comprising an oxide material having a refractive index within the approximating range of 1.46–1.50 at a wavelength of 520 nm, the layer having a physical thickness of 65–75 nm;

said second layer being arranged on the third layer and comprising a metal having a refractive index within the approximating range of 1.5–4.0 at a wavelength of 520 nm, the layer having a physical thickness of 0.2–1.5 nm;

said third layer being arranged on the fourth layer and comprising a metal having a refractive index within the approximating range of 0.2–1.4 at a wavelength of 520 nm, the layer having a physical thickness of 4–6 nm, and said fourth layer being arranged on the front surface on the substrate and comprising a metal having a refractive index within the approximating range of 1.5–4.0 at a wavelength of 520 nm, the fourth layer having a physical thickness of 0.1–1.5 nm.

2. The anti-reflection screen filter of claim 1, wherein said substrate is plastic.

3. The anti-reflection screen filter of claim 1, wherein said substrate is glass.

4. The anti-reflection screen filter of claim 1, wherein the first layer is $SiO_2$, said second and fourth layers are of NiCr(Cr 30%), and said third layer is AuNi(Ni 8%).

5. The anti-reflection screen filter of claim 1, wherein the first layer comprises oxides selected from the group consisting of $SiO_2$ and SiAl-oxide.

6. The anti-reflection screen filter of claim 1, wherein the second layer comprises metal selected from the group consisting of Cr, Ni, V, Ti, Co, Ta, and mixtures of these metals.

7. The anti-reflection screen filter of claim 1, wherein the third layer comprises metal selected from the group consisting of Au, Ag, Cu, and mixtures of these metals.

8. The anti-reflection screen filter of claim 1, wherein the fourth layer comprises metal selected from the group consisting of Cr, Ni, V, Ti, Co, Ta, and mixtures of these metals.

9. The anti-reflection screen filter of claim 1, wherein the layers are applied by a method selected from the group consisting of an evaporation or sputtering manufacturing process in one of a batch or in-line vacuum system.

* * * * *